(12) United States Patent
Qiu

(10) Patent No.: US 8,514,734 B2
(45) Date of Patent: Aug. 20, 2013

(54) METHOD FOR PROCESSING BANDWIDTH, NETWORK DEVICE AND NETWORK SYSTEM

(75) Inventor: Xianwen Qiu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 12/796,988

(22) Filed: Jun. 9, 2010

(65) Prior Publication Data

US 2010/0316376 A1    Dec. 16, 2010

(30) Foreign Application Priority Data

Jun. 12, 2009 (CN) .......................... 2009 1 0147224

(51) Int. Cl.
*H04L 12/56* (2011.01)
(52) U.S. Cl.
USPC ............................. 370/252; 370/428; 398/25
(58) Field of Classification Search
None
See application file for complete search history.

(56) References Cited

U.S. PATENT DOCUMENTS

| | | | | |
|---|---|---|---|---|
| 5,938,749 | A * | 8/1999 | Rusu et al. ....................... | 710/54 |
| 8,078,057 | B2 * | 12/2011 | Wang ............................... | 398/99 |
| 2002/0075888 | A1 * | 6/2002 | Shimada et al. ............... | 370/428 |
| 2004/0252714 | A1 * | 12/2004 | Oh et al. ......................... | 370/437 |
| 2005/0158048 | A1 * | 7/2005 | Sung et al. ...................... | 398/66 |
| 2007/0064731 | A1 * | 3/2007 | Mizutani et al. ............... | 370/468 |
| 2010/0080558 | A1 * | 4/2010 | Kazawa et al. ................. | 398/66 |
| 2010/0239255 | A1 * | 9/2010 | Ikeda et al. ...................... | 398/66 |
| 2011/0123194 | A1 * | 5/2011 | Sisto et al. ...................... | 398/58 |

FOREIGN PATENT DOCUMENTS

| | | |
|---|---|---|
| CN | 1614944 A | 5/2005 |
| CN | 1933653 A | 3/2007 |
| CN | 1972291 A | 5/2007 |
| CN | 1984423 A | 6/2007 |

OTHER PUBLICATIONS

ITU-T Recommendation G.984.3, "Gigabit-capable Passive Optical Networks (G-PON): Transmission convergence layer specification", Feb. 2004, 114 pages.
ITU-T Recommendation G.984.3 (2004)—Amendment 1, "Gigabit-capable Passive Optical Networks (G-PON): Transmission convergence layer specification", Jul. 2005, 45 pages.
ITU-T Recommendation G.984.3 (2004)—Amendment 2, "Gigabit-capable Passive Optical Networks (G-PON): Transmission convergence layer specification", Mar. 2006, 11 pages.
ITU-T Recommendation G.984.3 (2004)—Amendment 3, "Gigabit-capable Passive Optical Networks (G-PON): Transmission convergence layer specification", Dec. 2006, 10 pages.
ITU-T Recommendation G.983.4, "A broadband optical access system with increased service capability using dynamic bandwidth assignment", Nov. 2001, 90 pages.

* cited by examiner

*Primary Examiner* — Hassan Phillips
*Assistant Examiner* — Duc Duong

(57) ABSTRACT

A method for processing bandwidth is disclosed to improve the bandwidth assignment accuracy. The method for processing bandwidth includes: obtaining the buffered data amount reported by an optical network unit (ONU) at this time and the previous time; determining difference between the buffered data amount reported at this time and the buffered data amount reported at the previous time; and assigning bandwidth according to the difference of the buffered data amount and previously assigned bandwidth. A network device and a network system are also provided.

16 Claims, 5 Drawing Sheets

METHOD FOR PROCESSING BANDWIDTH, NETWORK DEVICE AND NETWORK SYSTEM

CROSS-REFERENCE TO RELATED APPLICATION

This application claims priority under 35 U.S.C. §119 to Chinese Patent Application No. 200910147224.4, filed on Jun. 12, 2009, which is hereby incorporated by reference in its entirety.

TECHNICAL FIELD

The disclosure relates to network communication technology, and in particular, to a method for processing bandwidth, a network device, and a network system.

BACKGROUND

On communication networks such as an optical communication network, a gigabit capability passive optical network (GPON) system generally includes an optical line termination (OLT) at the central office, an optical network unit (ONU) at the client and an optical distribution network (ODN) between the central office and the client. The ONU includes an optical network termination (ONT). The ONT includes transmission containers (TCONTs). The ODN provides an optical transmission medium for the physical connection between the OLT and the ONU. The OLT assigns bandwidth to the ONU.

A dynamic bandwidth assignment (DBA) method is available in the prior art. This method includes two report modes: non status report (NSR) and status report (SR). In SR mode, the ONU reports the buffered data amount of the ONU periodically; the OLT calculates the bandwidth according to the buffered data amount reported by the ONU, reassigns bandwidth to the ONU, and distributes the reassigned bandwidth.

During the research and practice of this method in the prior art, the inventor of the present invention discovers the following problems: The bandwidth is assigned according to the buffered data amount reported by the ONU; however, the actual bandwidth traffic may be very small when the buffered data amount is large, and the actual bandwidth traffic may be very large when the buffered data amount is small. In this way, the buffered data amount cannot reflect the actual amount of the bandwidth traffic, which may cause inaccurate bandwidth assignment and affect the service performance.

SUMMARY

Embodiments of the present invention provide a method for processing bandwidth, a network device, and a network system.

A method for processing bandwidth includes:
obtaining buffered data amount reported by an ONU at this time and the previous time;
determining difference between the buffered data amount reported at this time and the buffered data amount reported at the previous time; and
assigning bandwidth according to the difference and previously assigned bandwidth.

A network device includes:
a first information obtaining unit, configured to obtain buffered data amount reported by an ONU at this time and the previous time;
a first information processing unit, configured to determine difference between the buffered data amount reported at this time and the buffered data amount reported at the previous time; and
an assigning unit, configured to assign bandwidth according to the difference and the previously assigned bandwidth.

A network system includes:
an ONU, configured to report buffered data amount; and
an OLT, configured to obtain the buffered data amount reported by the ONU at this time and the previous time; determine difference between the buffered data amount reported at this time and the buffered data amount reported at the previous time; and assign bandwidth according to the difference and the previously assigned bandwidth.

BRIEF DESCRIPTION OF THE DRAWINGS

To illustrate the technical solution according to the embodiments of the present invention more clearly, the accompanying drawings for describing the embodiments are provided briefly below. Apparently, the accompanying drawings in the following description are only some embodiments of the present invention, and persons of ordinary skill in the art can derive other drawings from the accompanying drawings without creative work.

DETAILED DESCRIPTION

The technical solution of the present invention is hereinafter described in detail with reference to the accompanying drawings. It is evident that the embodiments are only exemplary embodiments of the present invention and the present invention is not limited to such embodiments. Other embodiments that those skilled in the art obtain based on embodiments of the present invention also fall within the scope of protection of the present invention.

Embodiments of the present invention provide a method for processing bandwidth that can improve the bandwidth assignment accuracy. Embodiments of the present invention provide a network device and a network system. Details are given below.

Figure 1:
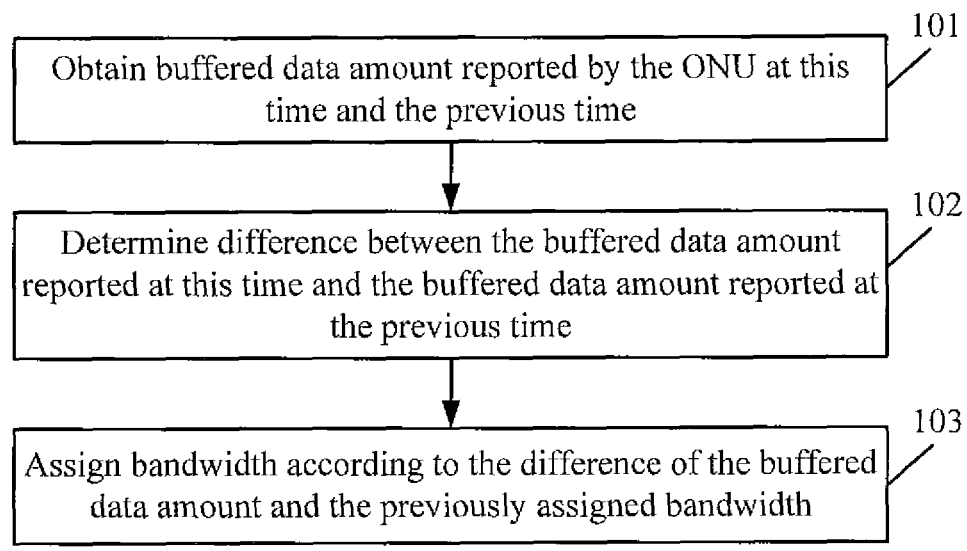
FIG. 1 is a flowchart of a method for processing bandwidth in a first embodiment of the present invention.

FIG. 1 is a flowchart of a method for processing bandwidth in the first embodiment of the present invention. The method includes the following steps:

Step 101: Obtain buffered data amount reported by the ONU at this time and the previous time.

In this embodiment, the buffered data amount reported by the ONU at each time is recorded.

Step 102: Determine difference between the buffered data amount reported at this time and the buffered data amount reported at the previous time.

Difference of the buffered data amount=Buffered data amount reported at this time—Buffered data amount reported at the previous time.

Step 103: Assign bandwidth according to the difference of the buffered data amount and the previously assigned bandwidth. In embodiments of the present invention, the bandwidth indicates the average traffic within a DBA period, that is, the data amount transmitted in unit time such as in each frame.

The currently added data amount is determined according to the previously assigned bandwidth and the difference of the buffered data amount. The currently added data amount indicates the buffered data traffic that enters the ONU within a DBA period, where the DBA period is from the previous time when the ONU reports the buffered data amount to this time when the ONU reports the buffered data amount.

The currently added data amount=(Previously assigned bandwidth)×(One DBA period)+(difference of the buffered data amount). The step of assigning the bandwidth according to the difference of buffered data amount and the previously assigned bandwidth includes: When the difference of the buffered data amount is not equal to zero, the assigned bandwidth is determined according to the currently added data amount if the buffered data amount reported at this time is smaller than the currently added data amount; and the assigned bandwidth is determined according to the buffered data amount reported at this time if the buffered data amount reported at this time is greater than or equal to the currently added data amount.

As seen from the first embodiment, the difference of the buffered data amount and the previously assigned bandwidth are used to determine the bandwidth to be assigned at this time. The bandwidth is determined according to the difference of the buffered data amount and the previously assigned bandwidth, that is, determined by the currently added data amount. This can better reflect the change trend of the buffered data amount.

In fact, if the currently added data amount is greater than the buffered data amount reported at this time, it indicates the data traffic enters the buffer at a higher rate and that burst data streams may exist. Thus, the bandwidth needs to be assigned according to the currently added data amount, which improves the data processing capacity in the buffer. If the current data amount is smaller than the buffered data amount reported at this time, it indicates that the data traffic enters the buffer at a lower rate. In this case, the bandwidth only needs to be assigned according to the data amount in the buffer. This ensures sufficient bandwidth for processing the data in the buffer and saves bandwidth for other ONUs.

According to the preceding description, in embodiments of the present invention, after the difference between the buffered data amount reported at this time and the buffered data amount reported at the previous time is determined, the bandwidth is assigned according to the difference and the previously assigned bandwidth. This is different from the prior art in which the bandwidth is assigned according to the buffered data amount reported at each time. The difference between the buffered data amount reported at this time and the buffered data amount reported at the previous time may reflect the change of the bandwidth traffic. In this way, the bandwidth may be assigned in a more accurate manner according to the difference of the buffered data amount and the previously assigned bandwidth. This improves the bandwidth assignment accuracy and maintains the service performance of the service system.

Figure 2:
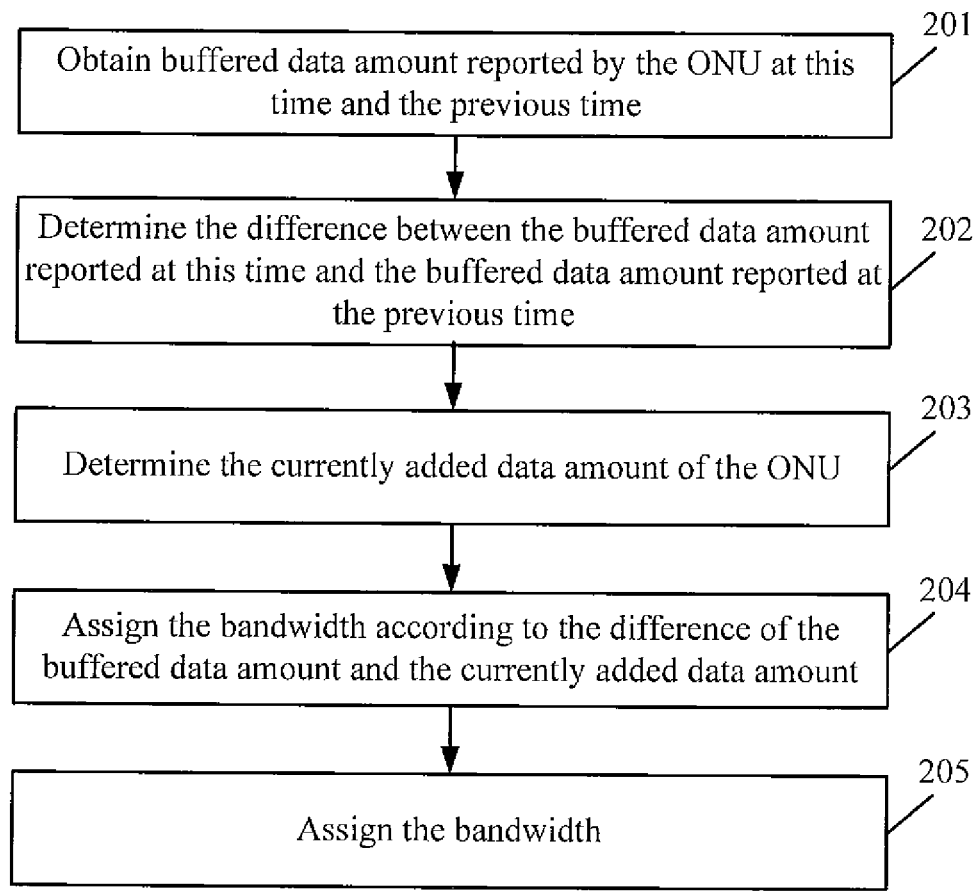
FIG. 2 is a flowchart of a method for processing bandwidth in a second embodiment of the present invention.

FIG. 2 is a flowchart of a method for processing bandwidth in the second embodiment of the present invention. The second embodiment describes the technical solution of the present invention in a more detailed manner. Details are as follows.

As shown in FIG. 2, the method includes the following steps:

Step 201: Obtain buffered data amount reported by the ONU at this time and the previous time.

In this embodiment, the buffered data amount reported by the ONU needs to be obtained. The buffered data amount is reported according to a DBA period, and is recorded each time after the buffered data amount is reported. The DBA period is generally defined in terms of data frames, each of which may be 125 us, and multiple frames may be used as a DBA period.

Figure 3:
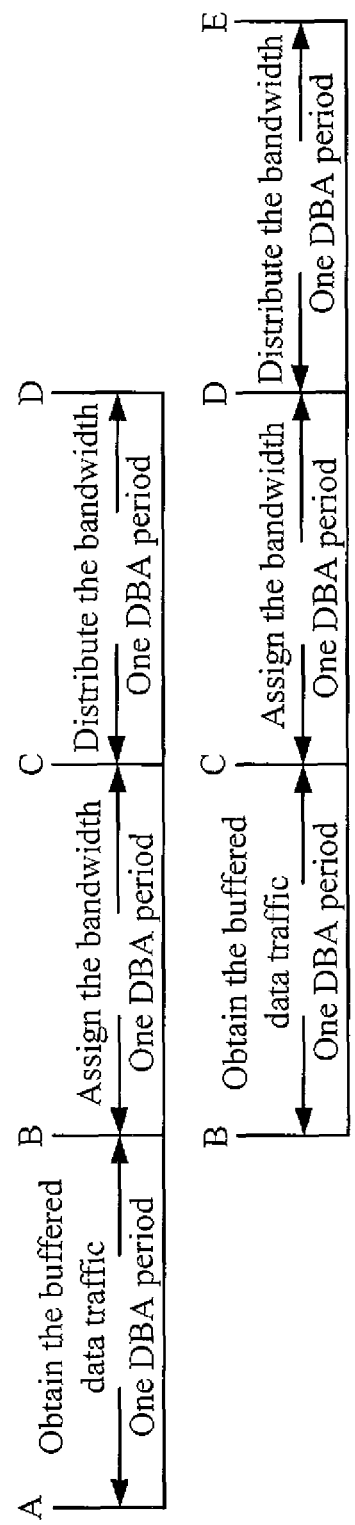
FIG. 3 illustrates the processing time of the method in an embodiment of the present invention.

FIG. 3 illustrates the processing time of the method in an embodiment of the present invention. As shown in FIG. 3, the buffered data amount reported in the previous DBA period (at time A) is marked with P_OLD, and the buffered data amount reported in the current DBA period (at time B) is marked with P_NEW. In addition, the bandwidth assigned between the previous DBA period and the current DBA period (that is, between time A and time B) may be marked with BW. In embodiments of the present invention, the bandwidth indicates the average traffic within a DBA period, that is, the data amount transmitted in unit time such as in each frame.

FIG. 3 also shows the assignment and distribution of bandwidth within a DBA period.

Step 202: Determine the difference between the buffered data amount reported at this time and the buffered data amount reported at the previous time.

In the previous step, the buffered data amount reported by the ONU at this time and the previous time is already obtained. That is, the buffered data amount reported in the previous DBA period is marked with P_OLD, and the buffered data amount reported in the current DBA period is marked with P_NEW. Then, the difference of the buffered data amount within this period is calculated by the following formula: $^\Delta P=(P\_NEW-P\_OLD)$, which can reflect the difference of the bandwidth traffic.

Step 203: Determine the currently added data amount of the ONU.

In addition, the bandwidth assigned between the previous DBA period and the current DBA period (that is, between time A and time B) may be marked with BW, where BW=(BW_USED+BW_IDLE). BW_USE indicates the bandwidth used in the bandwidth that is assigned to carry services; BW_IDLE indicates the bandwidth not used in the bandwidth that is assigned to carry services. That is, the BW includes BW_USED and BW_IDLE.

If BW is equal to zero, the currently added data amount of the ONU from time A to time B is $^\Delta P$, where $^\Delta P=(P\_NEW-P\_OLD)$.

If BW is not equal to zero, some buffered data amount may be cleared in time by distributing the assigned bandwidth BW. In this way, the currently added data amount of the ONU from time A to time B is "$^\Delta P+BW \times DBA$ period", which is calculated by the following formula: $^\Delta P+BW \times DBA$ period=$(P\_NEW-P\_OLD)+BW \times DBA$ period.

Step 204: Assign the bandwidth according to the difference of the buffered data amount and the currently added data amount.

This step needs to consider the following three cases:

(1) The difference of the buffered data amount is greater than zero, that is, the bandwidth traffic is increased.

When $^\Delta P$ is greater than zero, it indicates that the data traffic entering the buffer is increasing. At this time, the reported buffered data amount is increasing continuously, and BW_IDLE is zero in multiple successive periods. At this time, the previously assigned bandwidth cannot meet the requirement for the data traffic that gradually enters the buffer. Thus, the assigned bandwidth needs to be increased and is marked with BWMAP.

(A) If the value of P_OLD is small, for example, it is smaller than a preset threshold or approaches zero, the buffer space can hold more currently added data amount (equal to $^\Delta$P+BW×DBA period). That is, when P_NEW is smaller than ($^\Delta$P+BW×DBA period), the assigned bandwidth is calculated by the following formula: BWMAP=($^\Delta$P+BW×DBA period)/DBA period. (B) If the value of P_OLD is large, for example, it is greater than a preset threshold, the buffer space may not hold the currently added data amount ($^\Delta$P+BW×DBA period). That is, when P_NEW is greater than or equal to ($^\Delta$P+BW×DBA period), the assigned bandwidth is calculated by the following formula: WMAP=P_NEW/DBA period.

In this case, the buffered data amount may be cleared in time to save the buffer space for burst traffic next time.

(2) The difference of the buffered data amount is equal to zero, that is, the bandwidth traffic remains unchanged.

When the traffic remains stable, the reported buffered data amount is always stable, that is, $^\Delta$P is equal to zero. In this way, the assigned bandwidth BWMAP remains unchanged and is equal to the previously assigned bandwidth BW.

(3) The difference of the buffered data amount is smaller than zero, that is, the bandwidth traffic is decreased.

When the traffic is decreased, the reported buffered data amount is decreasing. BW_IDLE is greater than zero in multiple successive periods. In this case, $^\Delta$P is smaller than zero. This indicates that the bandwidth is greater than the data traffic entering the buffer. Thus the assigned bandwidth needs to be decreased and is marked with BWMAP.

(A) When P_NEW is smaller than ($^\Delta$P+BW×DBA period), the assigned bandwidth is calculated by the following formula: BWMAP=($^\Delta$P+BW×DBA period)/DBA period.

(B) When P_NEW is greater than or equal to ($^\Delta$P+BW×DBA period), the assigned bandwidth is calculated by the following formula: BWMAP=P_NEW/DBA period.

In conclusion, when the buffered data amount is increased (indicating that the bandwidth traffic needed is increased), the assigned bandwidth is based on the reported P_NEW. When the buffered data amount is decreased (indicating that the bandwidth traffic is decreased), the assigned bandwidth is based on ($^\Delta$P+BW×DBA period). Thus, these two cases are represented by the following formula:

$$BWMAP=MAX(P\_NEW, {}^\Delta P+BW \times DBA\ period)/DBA\ period$$

Thus, when the difference of the buffer is not equal to zero, BWMAP=MAX(P_NEW, $^\Delta$P+BW×DEA period)/DBA period. When the difference of the buffer is equal to zero, BWMAP=BW. The expression MAX(P_NEW, $^\Delta$P BW×DBA period) indicates the greater value between P_NEW and ($^\Delta$P+BW×DBA period).

Step 205: Assign the bandwidth.

Compared with the prior art, the second embodiment can improve the bandwidth assignment accuracy. In the prior art, the bandwidth is assigned each time according to the previous buffered data amount, which cannot reflect the change of the bandwidth traffic accurately. When the bandwidth traffic is increased suddenly, a large amount of data is accumulated in the buffer space of the ONU if the assigned bandwidth is not increased in time due to inaccurate bandwidth assignment. If the buffer space of the ONU is insufficient, the buffered data is overflowed, causing a data loss. When the bandwidth traffic is decreased suddenly, if the assigned bandwidth is not reduced in time to keep consistency with the bandwidth traffic due to the inaccurate bandwidth assignment, the assigned bandwidth is wasted. From the perspective of the entire service system, the total carried traffic is fixed. If the bandwidth of an ONU is wasted, another ONU that needs bandwidth cannot fully use the bandwidth. Thus, the service performance of the entire system is reduced. The method provided in this embodiment is different from the bandwidth assignment method in the prior art. In this embodiment, the bandwidth is assigned according to the difference between the buffered data amount reported at this time and the buffered data amount reported at the previous time and the previously assigned bandwidth. The difference of the buffered data amount may reflect the change of the bandwidth traffic. Thus, the bandwidth is assigned more accurately according to the difference of the buffered data amount and the previously assigned bandwidth. This improves the bandwidth assignment accuracy and avoids the data loss and waste of bandwidth due to inaccurate bandwidth assignment, thus maintaining the service performance of the service system.

In addition, in the prior art, the bandwidth is assigned according to the reported buffered data amount. The buffered data amount, however, is related to the buffer space of the ONU. Thus, the bandwidth assignment method in the prior art depends a lot on the size of the buffer space of the ONU. In the technical solution provided in this embodiment, the bandwidth is assigned according to the difference of the buffered data amount, thus depending less on the ONU.

It should be noted that the preceding description is based on but is not limited to the GPON system. The preceding description is also applicable to other systems such as the Ethernet PON (EPON) system.

Detailed above is the method for processing bandwidth in embodiments of the present invention. Embodiments of the present invention also provide a network device and a network system.

Figure 4:
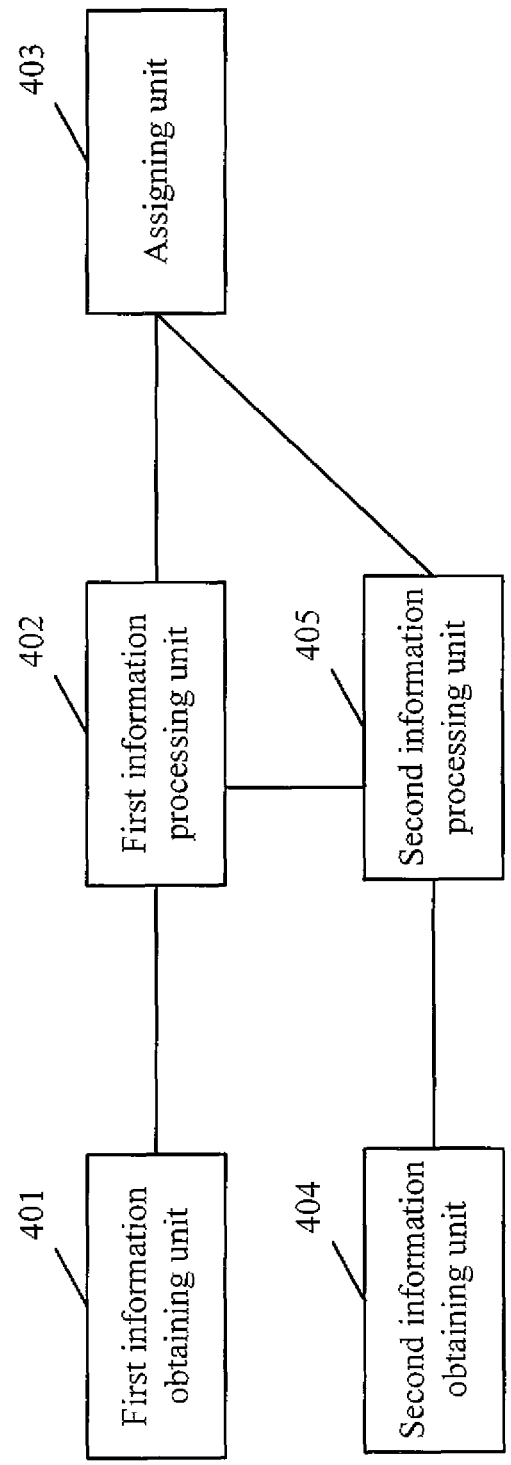
FIG. 4 shows a structure of a network device in an embodiment of the present invention.

FIG. 4 shows a structure of a network device in an embodiment of the present invention. The network device may be an OLT.

As shown in FIG. 4, the network device includes a first information obtaining unit 401, a first information processing unit 402, and an assigning unit 403.

The first information obtaining unit 401 is configured to obtain buffered data amount reported by the ONU at this time and the previous time.

The first information processing unit 402 is configured to determine difference between the buffered data amount reported at this time and the buffered data amount reported at the previous time.

The assigning unit 403 is configured to assign bandwidth according to the difference of the buffered data amount and the previously assigned bandwidth.

The assigning unit 403 is configured to: determine to increase the bandwidth when the difference of the buffered data amount determined by the first information processing unit 402 is greater than zero; determine to decrease the bandwidth when the difference of the buffered data amount is smaller than zero; and determine to retain the bandwidth when the difference of the buffered data amount is equal to zero.

The network device may further include a second information obtaining unit 404 and a second information processing unit 405.

The second information obtaining unit 404 is configured to obtain the previously assigned bandwidth.

The second information processing unit 405 is configured to determine the currently added data amount according to the previously assigned bandwidth and the difference of the buffered data amount, where the difference is determined by the first information processing unit 402.

The assigning unit 403 is configured to: when the difference of the buffered data amount is not equal to zero, determine the bandwidth to be assigned according to the currently added data amount if the buffered data amount reported at this time is smaller than the currently added data amount; and determine the bandwidth to be assigned according to the buffered data amount reported at this time if the buffered data amount reported at this time is greater than or equal to the currently added data amount.

Specifically, the assigning unit 403 is configured to determine the bandwidth to be assigned according to the following formula when the difference of the buffered data amount is not equal to zero:

BWMAP=MAX(P_NEW, $^\Delta$P+BW×DBA period)/DBA period, where: BWMAP indicates the bandwidth to be assigned; P_NEW indicates the buffered data amount reported at this time; $^\Delta$P indicates the difference of the buffered data amount; BW indicates the previously assigned bandwidth; and DBA period indicates the dynamic bandwidth assignment period.

Figure 5:
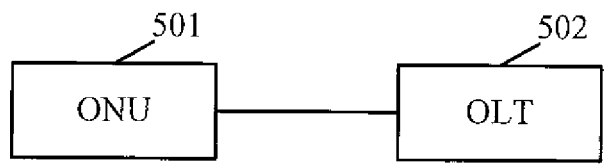
FIG. 5 shows a structure of a network system in an embodiment of the present invention.

FIG. 5 shows a structure of a network system in an embodiment of the present invention.

As shown in FIG. 5, the network system includes an ONU 501 and an OLT 502.

The ONU 501 is configured to report buffered data amount.

The OLT 502 is configured to: obtain the buffered data amount reported by the ONU 501 at this time and the previous time; determine difference between the buffered data amount reported at this time and the buffered data amount reported at the previous time, and assign bandwidth according to the difference of the buffered data amount and the previously assigned bandwidth.

The OLT 502 is configured to: determine to increase the bandwidth when the difference of the buffered data amount is greater than zero; determine to decrease the bandwidth when the difference of the buffered data amount is smaller than zero; and determine to retain the bandwidth when the difference of the buffered data amount is equal to zero.

The OLT 502 is further configured to obtain the previously assigned bandwidth and determine currently added data amount according to the previously assigned bandwidth and the difference of the buffered data amount. The step of assigning the bandwidth by the OLT 502 includes:

when the difference of the buffered data amount is not equal to zero, determine the bandwidth to be assigned according to the currently added data amount if the buffered data amount reported at this time is smaller than the currently added data amount; determine the bandwidth to be assigned according to the buffered data amount reported at this time if the buffered data amount reported at this time is greater than or equal to the currently added data amount.

The OLT 502 has the structure shown in FIG. 4. Details are not provided here.

In conclusion, in embodiments of the present invention, after the difference between the buffered data amount reported at this time and the buffered data amount reported at the previous time is determined, the bandwidth is assigned according to the difference of the buffered data amount and the previously assigned bandwidth. This is different from the prior art in which the bandwidth is assigned according to the buffered data amount reported at each time. The difference between the buffered data amount reported at this time and the buffered data amount reported at the previous time may reflect the change of the bandwidth traffic. In this way, the bandwidth may be assigned in a more accurate manner according to the difference of the buffered data amount and the previously assigned bandwidth. This improves the bandwidth assignment accuracy and maintains the service performance of the service system.

It is understandable by those skilled in the art that all or part of steps of the methods in embodiments of the present invention may be completed by related hardware instructed by a program. The program may be stored in a computer readable storage medium. The storage medium may include a read only memory (ROM), a random access memory (RAM), a magnetic disk, or a compact disk (CD).

Detailed above are a method for processing bandwidth, a network device and a network system provided in embodiments of the present invention. Specific embodiments are used to describe the principle and implementation modes of the present invention. The preceding embodiments are only intended to help understand the method and its core idea of the present invention. It is apparent to persons skilled in the art that various modifications and variations can be made to the present invention without departing from the scope or spirit of the invention. To conclude, the present invention should not be limited to the specifications.

What is claimed is:

1. A method for processing bandwidth, the method comprising:

in an optical line termination (OLT), performing:
  obtaining a buffered data amount reported by an optical network unit (ONU) at a current time and at a previous time;
  determining a difference between the buffered data amount reported at the current time and the buffered data amount reported at the previous time;
  determining a currently assigned bandwidth according to the difference and a previously assigned bandwidth, comprising:
    if the difference is greater than zero, determining a currently assigned bandwidth that is bigger than the previously assigned bandwidth,
    if the difference is smaller than zero, determining a currently assigned bandwidth that is smaller than the previously assigned bandwidth, and
    if the difference is equal to zero, determining a currently assigned bandwidth that is equal to the previously assigned bandwidth; and assigning the currently assigned bandwidth to the ONU.

2. The method of claim 1, wherein determining the currently assigned bandwidth according to the difference and the previously assigned bandwidth comprises:
  determining a currently added data amount according to the previously assigned bandwidth and the difference, wherein the currently added data amount indicates buffered data traffic entering the ONU within a dynamic bandwidth assignment (DBA) period; and
  when the difference is not equal to zero, determining the currently assigned bandwidth according to the currently added data amount if the buffered data amount reported at the current time is smaller than the currently added data amount; and determining the currently assigned bandwidth according to the buffered data amount reported at the current time if the buffered data amount reported at the current time is greater than or equal to the currently added data amount.

3. The method of claim 2, wherein determining the currently assigned bandwidth according to the currently added data amount if the buffered data amount reported at the current time is smaller than the currently added data amount; and determining the currently assigned bandwidth according to the buffered data amount reported at the current time if the buffered data amount reported at the current time is greater than or equal to the currently added data amount comprises:
determining the currently assigned bandwidth according to the following formula:
BWMAP=MAX (P_NEW, $^{\Delta}$P+BW×DBA period)/DBA period, wherein: BWMAP indicates the currently assigned bandwidth; P_NEW indicates the buffered data amount reported at the current time; $^{\Delta}$P indicates the difference; BW indicates the previously assigned bandwidth; and DBA period indicates the dynamic bandwidth assignment period.

4. The method of claim 2, wherein the currently added data amount equals the previously assigned bandwidth multiplied by a sum of the DBA period and the difference of the buffered data amount.

5. A network device, comprising:
a first information obtaining unit, configured to obtain a buffered data amount reported by an optical network unit (ONU) at a current time and at a previous time;
a first information processing unit, configured to determine a difference between the buffered data amount reported at the current time and the buffered data amount reported at the previous time; and
an assigning unit, configured to assign a currently assigned bandwidth to the ONU according to the difference and a previously assigned bandwidth; wherein the assigning unit is configured to:
determine a currently assigned bandwidth that is bigger than the previously assigned bandwidth, if the difference is greater than zero,
determine a currently assigned bandwidth that is smaller than the previously assigned bandwidth, if the difference is smaller than zero, and
determine a currently assigned bandwidth that is equal to the previously assigned bandwidth, if the difference is equal to zero.

6. The network device of claim 5, further comprising:
a second information obtaining unit, configured to obtain the previously assigned bandwidth; and
a second information processing unit, configured to determine a currently added data amount according to the previously assigned bandwidth and the difference, wherein the currently added data amount indicates buffered data traffic entering the ONU within a dynamic bandwidth assignment (DBA) period;
wherein the assigning unit is configured to: when the difference is not equal to zero, determine the currently assigned bandwidth according to the currently added data amount if the buffered data amount reported at the current time is smaller than the currently added data amount; and determine the currently assigned bandwidth according to the buffered data amount reported at the current time if the buffered data amount reported at the current time is greater than or equal to the currently added data amount.

7. The network device of claim 6, wherein the assigning unit is further configured to:
determine the currently assigned bandwidth according to the following formula when the difference is not equal to zero:
BWMAP=MAX (P_NEW, $^{\Delta}$P+BW×DBA period)/DBA period, wherein: BWMAP indicates the currently assigned bandwidth; P_NEW indicates the buffered data amount reported at the current time; $^{\Delta}$P indicates the difference; BW indicates the previously assigned bandwidth; and DBA period indicates the dynamic bandwidth assignment period.

8. A network system, comprising:
an optical network unit (ONU), configured to report a buffered data amount; and
an optical line termination (OLT), configured to: obtain the buffered data amount reported by the ONU at a current time and at a previous time; determine a difference between the buffered data amount reported at the current time and the buffered data amount reported at the previous time; and assign a currently assigned bandwidth according to the difference and a previously assigned bandwidth; wherein the OLT further comprises:
a first information obtaining unit, configured to obtain the buffered data amount reported by the ONU at the current time and at the previous time,
a first information processing unit, configured to determine the difference between the buffered data amount reported at the current time and the buffered data amount reported at the previous time, and
an assigning unit, configured to:
determine a currently assigned bandwidth that is bigger than the previously assigned bandwidth, if the difference is greater than zero,
determine a currently assigned bandwidth that is smaller than the previously assigned bandwidth, if the difference is smaller than zero, and
determine a currently assigned bandwidth that is equal to the previously assigned bandwidth, if the difference is equal to zero.

9. The network system of claim 8, wherein the OLT further comprises:
a first information obtaining unit, configured to obtain the buffered data amount reported by the ONU at the current time and at the previous time;
a second information obtaining unit, configured to obtain the previously assigned bandwidth;
a first information processing unit, configured to determine the difference between the buffered data amount reported at the current time and the buffered data amount reported at the previous time; and
a second information processing unit, configured to determine a currently added data amount according to the previously assigned bandwidth and the difference, wherein the currently added data amount indicates buffered data traffic entering the ONU within a dynamic bandwidth assignment (DBA) period;
wherein the assigning unit is further configured to: when the difference is not equal to zero, determine the currently assigned bandwidth according to the currently added data amount if the buffered data amount reported at the current time is smaller than the currently added data amount; and determine the currently assigned bandwidth according to the buffered data amount reported at the current time if the buffered data amount reported at the current time is greater than or equal to the currently added data amount.

10. The network system of claim 9, wherein the assigning unit is further configured to:
determine the currently assigned bandwidth according to the following formula when the difference is not equal to zero:
BWMAP=MAX (P_NEW, $^{\Delta}$P+BW×DBA period)/DBA period, wherein: BWMAP indicates the currently assigned bandwidth; P_NEW indicates the buffered data amount reported at the current time; $\Delta$P indicates the difference; BW indicates the previously assigned bandwidth; and DBA period indicates the dynamic bandwidth assignment period.

11. The network system of claim 8, wherein the network system is a gigabit capability passive optical network (GPON) system, or an Ethernet passive optical network (EPON) system.

12. A method for processing bandwidth, the method comprising:
in an optical line termination (OLT), performing:
obtaining a buffered data amount reported by an optical network unit (ONU) at a current time and at a previous time;
determining a difference between the buffered data amount reported at the current time and the buffered data amount reported at the previous time;
determining a currently assigned bandwidth according to the difference and a previously assigned bandwidth, comprising:
determining a currently added data amount according to the previously assigned bandwidth and the difference, wherein the currently added data amount indicates buffered data traffic entering the ONU within a dynamic bandwidth assignment (DBA) period; and
when the difference is not equal to zero, determining the currently assigned bandwidth according to the currently added data amount if the buffered data amount reported at the current time is smaller than the currently added data amount; and determining the currently assigned bandwidth according to the buffered data amount reported at the current time if the buffered data amount reported at the current time is greater than or equal to the currently added data amount; and assigning the currently assigned bandwidth to the ONU.

13. The method of claim 12, wherein determining the currently assigned bandwidth according to the currently added data amount if the buffered data amount reported at the current time is smaller than the currently added data amount; and determining the currently assigned bandwidth according to the buffered data amount reported at the current time if the buffered data amount reported at the current time is greater than or equal to the currently added data amount comprises:
determining the currently assigned bandwidth according to the following formula:
BWMAP=MAX (P_NEW, $^\Delta$P +BW×DBA period)/DBA period, wherein: BWMAP indicates the currently assigned bandwidth; P_NEW indicates the buffered data amount reported at the current time; $^\Delta$P indicates the difference; BW indicates the previously assigned bandwidth; and DBA period indicates the dynamic bandwidth assignment period.

14. The method of claim 12, wherein the currently added data amount equals the previously assigned bandwidth multiplied by a sum of the DBA period and the difference of the buffered data amount.

15. A network device, comprising:
a first information obtaining unit, configured to obtain a buffered data amount reported by an optical network unit (ONU) at a current time and at a previous time;
a first information processing unit, configured to determine a difference between the buffered data amount reported at the current time and the buffered data amount reported at the previous time;
an assigning unit, configured to assign a currently assigned bandwidth to the ONU according to the difference and a previously assigned bandwidth;
a second information obtaining unit, configured to obtain the previously assigned bandwidth; and
a second information processing unit, configured to determine a currently added data amount according to the previously assigned bandwidth and the difference, wherein the currently added data amount indicates buffered data traffic entering the ONU within a dynamic bandwidth assignment (DBA) period;
wherein the assigning unit is configured to: when the difference is not equal to zero, determine the currently assigned bandwidth according to the currently added data amount if the buffered data amount reported at the current time is smaller than the currently added data amount; and determine the currently assigned bandwidth according to the buffered data amount reported at the current time if the buffered data amount reported at the current time is greater than or equal to the currently added data amount.

16. The network device of claim 15, wherein the assigning unit is further configured to:
determine the currently assigned bandwidth according to the following formula when the difference is not equal to zero:
BWMAP=MAX (P_NEW, $^\Delta$P +BW×DBA period)/DBA period, wherein: BWMAP indicates the currently assigned bandwidth; P_NEW indicates the buffered data amount reported at the current time; $^\Delta$P indicates the difference; BW indicates the previously assigned bandwidth; and DBA period indicates the dynamic bandwidth assignment period.

* * * * *